UNITED STATES PATENT OFFICE 2,619,406

METHOD FOR THE SOLID PHASE PRODUCTION OF A DISILICIDE

Robert M. Briney, Douglaston, N. Y., assignor to Union Carbide and Carbon Corporation, a corporation of New York No Drawing. Application April 27, 1949, Serial No. 90,051

1 Claim. (Cl. 23—204)

The invention relates to an improved process for producing silicides of tungsten and molybdenum. These compounds have heretofore been prepared by melting either elemental tungsten or molybdenum with elemental silicon. However, at the temperatures required for fusion, undesirable reaction occurs between the molten material and the containing vessel, resulting in contamination of the products, with consequent deleterious effects upon their properties.

Many attempts have been made by prior art workers to overcome these difficulties. It has been proposed, for example, to react the oxide of tungsten or molybdenum with silicon in a furnace heated by an oxy-hydrogen blowpipe. Other proposals include the use of fluxes such as lime and magnesia together with mixes including the metal oxide, silicon carbide and carbon. It has also been proposed to use cryolite as a flux and lime to slow down the reaction with mixes including the metal oxide, silica, boric oxide, copper and aluminum; in which case the resulting product could be leached with nitric acid and dilute hydrofluoric acid to free the crystals of the metal silicide. Even such materials as flowers of sulphur, cuprosilicon free from iron and ferrosilicon have been proposed as reagents for use in the production of tungsten and molybdenum silicide. None of these attempts has resulted in a commercially attractive process, or desirable product.

It is a primary object of the present invention to provide a process for the production of tungsten and molybdenum silicides of high purity wherein reaction between the materials and the containing vessel is avoided.

Another object is to provide a process for the production of tungsten and molybdenum silicides wherein the need for fluxes is eliminated.

Still a further object is to provide such a method wherein the entire product is in the form of the desired silicide, free from uncombined or elemental constituents.

The method of the present invention is based upon the discovery that the prior art difficulties may be minimized, and superior products produced, by heating in vacuo or inert atmospheres at temperatures below fusion, intimate mechanical mixtures of comminuted elemental tungsten or molybdenum and comminuted elemental silicon in proper proportions to form the disilicide of tungsten or molybdenum.

Temperatures between about 1400 and 1600° C. have been found suitable for the heating step of the treatment. The duration of the heating step should be at least sufficiently long to allow complete reaction between all the particles. When the heating step is done in vacuo, the absolute pressure preferably should be between .01 and .5 mm. of mercury. When an inert gas, such as argon, is employed the pressure preferably should be at least 10 mm. of mercury.

The reacting materials may be mixed in the stoichiometrical proportions required to yield the disilicide of tungsten and molybdenum. When stoichiometrical proportions are employed in the process, the end product may contain some subsilicides of tungsten and molybdenum along with the disilicide due to loss of silicon as silicon monoxide. Therefore, to assure the formation of the maximum percentage of the disilicide a slight excess of silicon may be employed. This excess should not be so great as to result in a residual of elemental silicon in the end product.

The particles of comminuted tungsten or molybdenum and comminuted silicon preferably should be no larger than will pass through a 30-mesh screen (0.0234 inch openings). Smaller particle sizes are desirable and afford more intimate contact between the reacting materials.

The effectiveness of the method of the invention as applied to the production of tungsten disilicide ($WSi_2$) and molybdenum disilicide ($MoSi_2$) is shown in the examples below.

100 parts of tungsten powder containing 99.62% tungsten were intimately mixed with 30.5 parts of silicon powder containing 99.84% silicon, both materials being comminuted to a size to pass through a 325 mesh screen (0.0017 inch openings). The comminuted mixture was mechanically pressed into pellets weighing approximately 50 grams each.

Nine and one-half pounds of these pellets were placed in a covered graphite crucible and heated for 16 hours at a temperature of 1400° C. under an absolute pressure of about .2 mm. of mercury. The product analyzed:

|  | Per cent |
|---|---|
| Tungsten | 76.77 |
| Silicon | 22.25 |
| Carbon | 0.24 |
| Iron | 0.07 |

Elemental tungsten or silicon could not be detected by X-ray diffraction examination.

As a comparison, two and one-half pounds of these same pellets were melted in an electric arc furnace. The melted product analyzed:

|  | Per cent |
|---|---|
| Tungsten | 75.81 |
| Silicon | 22.90 |
| Carbon | 1.00 |
| Iron | .11 |

The melted product contained four-fold as much carbon as the product produced according to the method of the invention.

In order to determine the relationship of temperature to time of treatment in the method of the invention, three of the above-described pellets were heated under an absolute pressure of about .3 mm. of mercury as follows:

One for 1 hour at 1600° C.; one for 1½ hours at 1400° C.; and the third for 8 hours at 1400° C. By X-ray diffraction the pellet treated for one hour at 1600° C. showed complete conversion to tungsten disilicide. The pellet treated for 1½ hours at 1400° C. showed the presence of both elemental tungsten and silicon but the pellet treated for 8 hours at this same temperature showed complete conversion to tungsten disilicide.

The application of the method of the invention to the production of molybdenum disilicide is shown in the following examples.

100 parts of molybdenum powder containing 99.75% molybdenum and of a particle size to pass through a 200 mesh screen (0.0029 inch openings) were intimately mixed with 58.5 parts of silicon powder containing 99.86% silicon and of a particle size to pass through a 100 mesh screen (0.0059 inch openings). The comminuted mixture was mechanically pressed into pellets weighing approximately 30 grams each.

Nineteen pounds of these pellets were placed in covered alumina crucibles and the whole heated for 8 hours at 1400° C. in argon under an absolute pressure of 10 to 15 mm. of mercury. The product analyzed:

|  | Per cent |
|---|---|
| Molybdenum | 63.55 |
| Silicon | 35.65 |
| Carbon | 0.11 |
| Iron plus aluminum | less than 0.10 |

No elemental molybdenum or silicon could be detected by X-ray diffraction examination.

In another example on a larger scale, a mixture containing 64.65 pounds of molybdenum powder having a particle size to pass through a 325 mesh screen (0.0017 inch openings); 37.93 pounds of silicon powder having a particle size to pass through a 30 mesh screen (0.0278 inch openings) but not to pass through an 80 mesh screen (0.007 inch openings); and three pounds of water were blended and pelleted. The pellets were packed into magnesia crucibles and heated for 8 hours at 1400° C. in argon at an absolute pressure of between 12 and 15 mm. of mercury.

The treated pellets were ground and a representative sample taken. The analysis of the material obtained compared with the theoretical analysis of molybdenum disilicide is shown below:

|  | Actual Analysis of Treated Material | Theoretical Analysis of Molybdenum Disilicide |
|---|---|---|
|  | Percent | Percent |
| Molybdenum | 63.39 | 63.09 |
| Silicon | 36.40 | 36.91 |

X-ray diffraction examination of the treated material showed complete conversion to molybdenum disilicide.

What is claimed is:

In the method for the solid phase production of a disilicide of a metal selected from the group consisting of tungsten and molybdenum by preparing a comminuted mixture of silicon and said metal, said mixture containing silicon in an amount equal to the stoichiometrical amount required to form the disilicide of the metal, and heating said mixture in an inert atmosphere for a time sufficient to allow the elemental constituents to combine; the improvement in said process which comprises adding to said mixture, in addition to said silicon in an amount stoichiometrically sufficient to form the disilicide of the metal, an amount of silicon sufficient to combine with the combined oxygen associated with said mixture, but insufficient to result in a residual of elemental silicon in the end product, and heating said mixture to a temperature of at least 1400° C. for a time sufficient to effect the volatilization of silicon monoxide (SiO) and to form the disilicide of the metal.

ROBERT M. BRINEY.

REFERENCES CITED

The following references are of record in the file of this patent:

Chem. Abstracts, vol. 12, p. 335, 1918.